United States Patent
Fukuda

(10) Patent No.: US 11,450,040 B2
(45) Date of Patent: Sep. 20, 2022

(54) DISPLAY CONTROL DEVICE AND DISPLAY SYSTEM

(71) Applicant: Clarion Co., Ltd., Saitama (JP)

(72) Inventor: Daisuke Fukuda, Saitama (JP)

(73) Assignee: CLARION CO., LTD., Saitama (JP)

(*) Notice: Subject to any disclaimer, the term of this patent is extended or adjusted under 35 U.S.C. 154(b) by 121 days.

(21) Appl. No.: 16/963,904

(22) PCT Filed: Oct. 1, 2018

(86) PCT No.: PCT/JP2018/036744
§ 371 (c)(1),
(2) Date: Jul. 22, 2020

(87) PCT Pub. No.: WO2019/146162
PCT Pub. Date: Aug. 1, 2019

(65) Prior Publication Data
US 2021/0042970 A1    Feb. 11, 2021

(30) Foreign Application Priority Data

Jan. 25, 2018  (JP) .............................. JP2018-010217

(51) Int. Cl.
*G09G 5/00* (2006.01)
*G06T 11/20* (2006.01)
(Continued)

(52) U.S. Cl.
CPC .............. *G06T 11/203* (2013.01); *B60R 1/00* (2013.01); *B62D 15/021* (2013.01); *G01B 21/22* (2013.01);
(Continued)

(58) Field of Classification Search
CPC ....... G06T 19/00; G06T 19/006; G06T 17/00; H04N 5/272; A63F 13/10
(Continued)

(56) References Cited

U.S. PATENT DOCUMENTS

2010/0238283 A1* 9/2010 Kim .......................... G06T 7/73
                                                        348/135
2013/0135478 A1    5/2013 Kim
(Continued)

FOREIGN PATENT DOCUMENTS

CN     101984478     3/2011
CN     103465909    12/2013
(Continued)

OTHER PUBLICATIONS

Extended European Search Report dated Sep. 27, 2021 in corresponding European Patent Application No. 18902712.1.
(Continued)

*Primary Examiner* — Gordon G Liu
(74) *Attorney, Agent, or Firm* — Wenderoth, Lind & Ponack, L.L.P.

(57) ABSTRACT

A display control device includes a front image acquiring portion configured to acquire front images by a front camera that images a front of a vehicle traveling on a traveling lane, a lane line position calculation portion configured to calculate a position of a lane line separating the traveling lane and an adjacent lane adjacent to the traveling lane based on movement of the vehicle in a period from a point at which the front image is acquired by the front camera, a movement track calculation portion configured to calculate a movement track of the vehicle, a map creating portion configured to create a map, and a display control portion configured to display, a synthesized image in which a pseudo lane line image corresponding to the lane line is superimposed onto a rear side image acquired after the movement of the vehicle by a rear side camera based on the map.

8 Claims, 11 Drawing Sheets

(51) Int. Cl.
*G06T 7/73* (2017.01)
*B60R 1/00* (2022.01)
*B62D 15/02* (2006.01)
*G01B 21/22* (2006.01)
*G01P 3/00* (2006.01)
*G01S 17/42* (2006.01)
*G06T 11/00* (2006.01)
*H04N 5/247* (2006.01)
*H04N 5/272* (2006.01)
*G06V 20/56* (2022.01)

(52) U.S. Cl.
CPC ............... *G01P 3/00* (2013.01); *G01S 17/42* (2013.01); *G06T 7/73* (2017.01); *G06T 11/001* (2013.01); *G06V 20/588* (2022.01); *H04N 5/247* (2013.01); *H04N 5/272* (2013.01); *B60R 2300/105* (2013.01); *B60R 2300/20* (2013.01); *B60R 2300/307* (2013.01); *B60R 2300/804* (2013.01); *G06T 2207/30256* (2013.01)

(58) Field of Classification Search
USPC ........................................................ 345/632
See application file for complete search history.

(56) References Cited

U.S. PATENT DOCUMENTS

| | | | |
|---|---|---|---|
| 2013/0314503 A1* | 11/2013 | Nix | G06K 9/00805 348/46 |
| 2013/0321630 A1 | 12/2013 | Shin | |
| 2014/0009618 A1 | 1/2014 | Imai et al. | |
| 2014/0085466 A1* | 3/2014 | Moriyama | G08G 1/165 348/148 |
| 2014/0092237 A1* | 4/2014 | Watanabe | G06K 9/00798 348/118 |
| 2014/0188345 A1 | 7/2014 | Tamura et al. | |
| 2014/0364223 A1 | 12/2014 | Dietrich et al. | |
| 2014/0368545 A1 | 12/2014 | Ban et al. | |
| 2016/0300491 A1 | 10/2016 | Fukuda et al. | |

FOREIGN PATENT DOCUMENTS

| | | |
|---|---|---|
| CN | 103523013 | 1/2014 |
| CN | 103909968 | 7/2014 |
| CN | 105765641 | 7/2016 |
| CN | 106080393 | 11/2016 |
| CN | 107097794 | 8/2017 |
| CN | 107310475 | 11/2017 |
| CN | 107392103 | 11/2017 |
| DE | 10 2013 114 109 | 7/2014 |
| DE | 11 2014 005 398 | 8/2016 |
| EP | 2 682 897 | 1/2014 |
| EP | 2 720 460 | 4/2014 |
| JP | 2007-22454 | 2/2007 |
| JP | 2007-241470 | 9/2007 |
| JP | 2010-12904 | 1/2010 |
| JP | 2014-13455 | 1/2014 |
| JP | 2014-129021 | 7/2014 |
| JP | 2015-101282 | 6/2015 |
| JP | 2016-224722 | 12/2016 |
| KR | 10-2010-0032005 | 3/2010 |
| KR | 101428094 | 8/2014 |
| WO | 2015/079623 | 6/2015 |

OTHER PUBLICATIONS

Office Action dated Apr. 21, 2021 in Chinese Patent Application No. 201880087535.3.
International Search Report dated Dec. 18, 2018 in International (PCT) Application No. PCT/JP2018/036744.

* cited by examiner

DISPLAY CONTROL DEVICE AND DISPLAY SYSTEM

CROSS-REFERENCE TO RELATED APPLICATION

This application is based upon and claims the benefit of priority from Japanese Patent Application No. 2018-010217 filed on Jan. 25, 2018, the entire disclosure of which is incorporated herein by reference.

TECHNICAL FIELD

The present disclosure relates to a display control device and a display system.

BACKGROUND ART

General traffic lanes are separated by lane lines, for example, broken or solid white lines or yellow lines along a traveling direction of a vehicle. A conventional lane deviation warning device configured to image a front of a vehicle traveling on a traveling lane, to detect a lane line separating the traveling lane and a traffic lane adjacent to the traveling lane based on the imaged image, and to output a warning signal when it is determined that the vehicle deviates from the traveling lane (see JP 2016-224722 A, for example).

PATENT LITERATURE

Summary

For example, a side mirror is used for visually recognizing a rear side of the vehicle. Instead of such a side mirror, a system configured to image the rear side of the vehicle by a camera, and to display, on a monitor, the rear side image acquired by the imaging is used. However, in such a system in which the side mirror is replaced with the rear side camera, an imaging element of the camera has a dynamic range narrower than that of a human eye, and the rear side image may not be displayed on the monitor due to exposure correction of the camera. As a result, a driver may not visually recognize the rear side of the vehicle.

For example, during nighttime traveling, when a distance between the vehicle and a following vehicle is short, the exposure is corrected in accordance with brightness of a headlight of the following vehicle, and a relatively dark lane line in the rear side image is blacked, so that such a lane line is not displayed on the monitor. As a result, a driver cannot visually recognize the lane line. Moreover, during daytime traveling, when sunlight is incident on the rear side camera due to backlight, for example, the lane line in the rear side image is not displayed on the monitor due to halation caused by the brightness of the sunlight. As a result, a driver cannot visually recognize the lane line.

The present disclosure has been made in view of the above problem, and an object of the present disclosure is to provide a display control device and a display system capable of displaying the lane line to be clearly recognized by a driver even under a condition in which it is difficult for the lane line to be reflected in the rear side image.

Solution to Problem

To achieve the above object, the present disclosure provides a display control device including a front image acquiring portion configured to acquire front images acquired in a chronological order by a front camera that images a front of a vehicle traveling on a traveling lane, lane line position calculation portion configured to calculate a position of a lane line separating the traveling lane and an adjacent lane adjacent to the traveling lane based on movement of the vehicle in a period from a point at which the front image is acquired by the front camera, a movement track calculation portion configured to calculate a movement track of the vehicle based on a speed vector of the vehicle, a map creating portion configured to create a map based on a calculation result of the lane line position calculation portion and a calculation result of the movement track calculation portion, and a display control portion configured to display, on a display portion, a synthesized image in which a pseudo lane line image corresponding to the lane line is superimposed onto a rear side image acquired after the movement of the vehicle by a rear side camera that images a rear side of the vehicle based on the map created by the map creating portion.

The present disclosure also provides a display system including the display control device according to the present disclosure, the display portion, a vehicle speed sensor configured to detect a vehicle speed of the vehicle, and a steering angle sensor configured to detect a steering angle of the vehicle.

DESCRIPTION OF EMBODIMENTS

Hereinafter, specific embodiments of a display control device and a display system according to the present disclosure will be described with reference to the accompanying drawings.

First Embodiment (Description of Adoption Scene of Display Control Device) At first, an overview of a display control device 100 (refer to FIG. 3) and a road condition to which the display control device 100 is adopted are described with reference to FIGS. 1, 2. The display control device 100 operates while a host vehicle 10 travels on a road having three traffic lanes on one side, for example.

Figure 1:
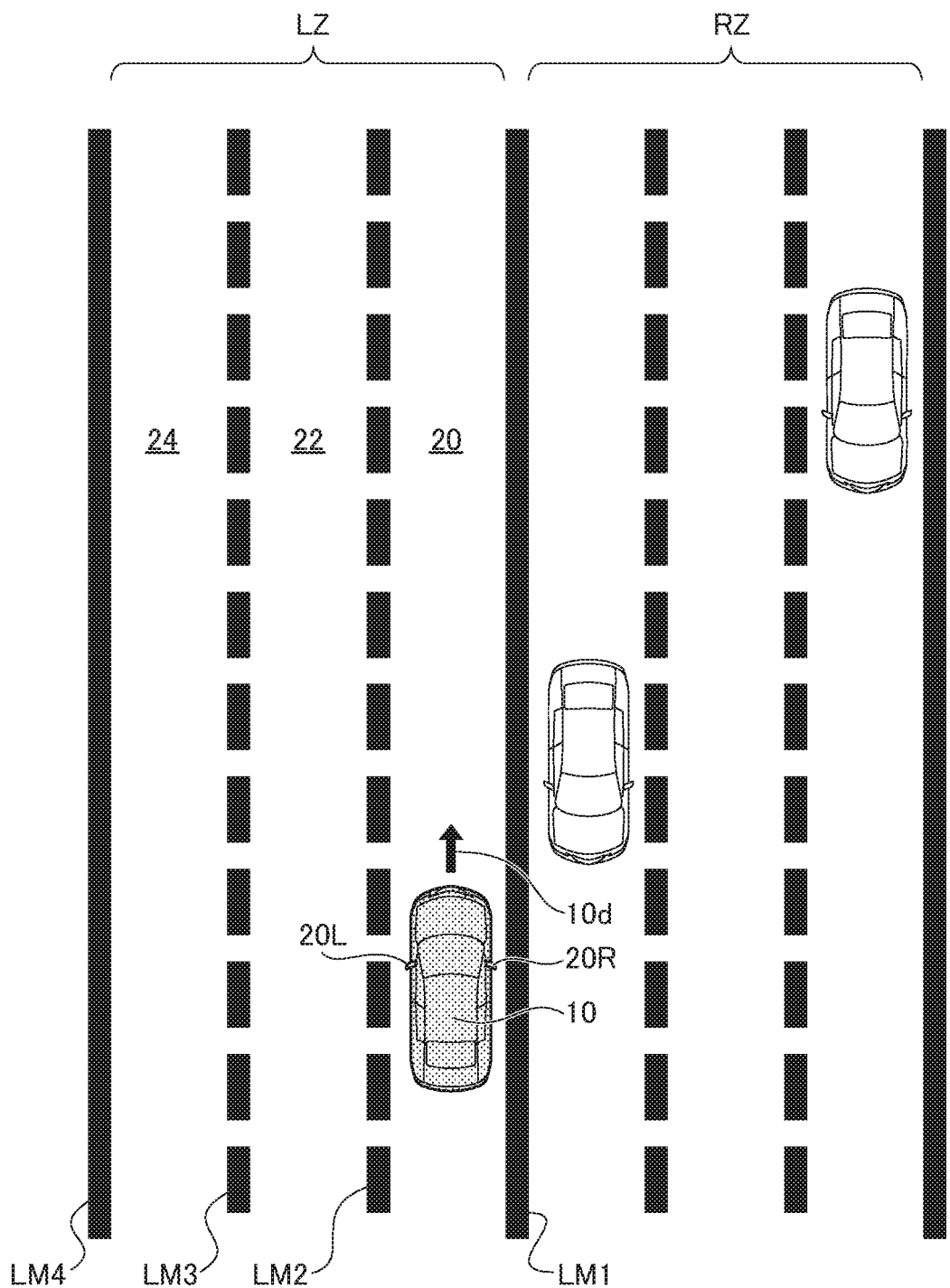
FIG. 1 is a view describing a road condition to which a display control device according to a first embodiment of the present disclosure is adopted.

FIG. 1 is a view illustrating one example of the road to which the display control device 100 is adopted. The road includes six traffic lanes in total having three traffic lanes in a left zone LZ and three traffic lanes in a right zone RZ. The left zone LZ includes a rightmost passing lane 20 (traveling lane), a traveling lane 22 (adjacent lane) adjacent to a left side of the passing lane 20, and a traveling lane 24 (next adjacent lane) adjacent to the traveling lane 22 on a side opposite to the passing lane 20.

The right zone RZ and the left zone LZ are separated by a lane marker LM1 (lane line). The passing lane 20 and the traveling lane 22 are separated by a lane marker LM2 (lane line). The traveling lane 22 and the traveling lane 24 are separated by a lane marker LM3 (lane line). In FIG. 1, the lane markers LM1, LM4 are illustrated by sloid lines, respectively, and the lane markers LM2, LM3 are illustrated by broken lines, respectively. The host vehicle 10 travels on the passing lane 20 upward in FIG. 1 (in arrow 10d direction).

Figure 2A:
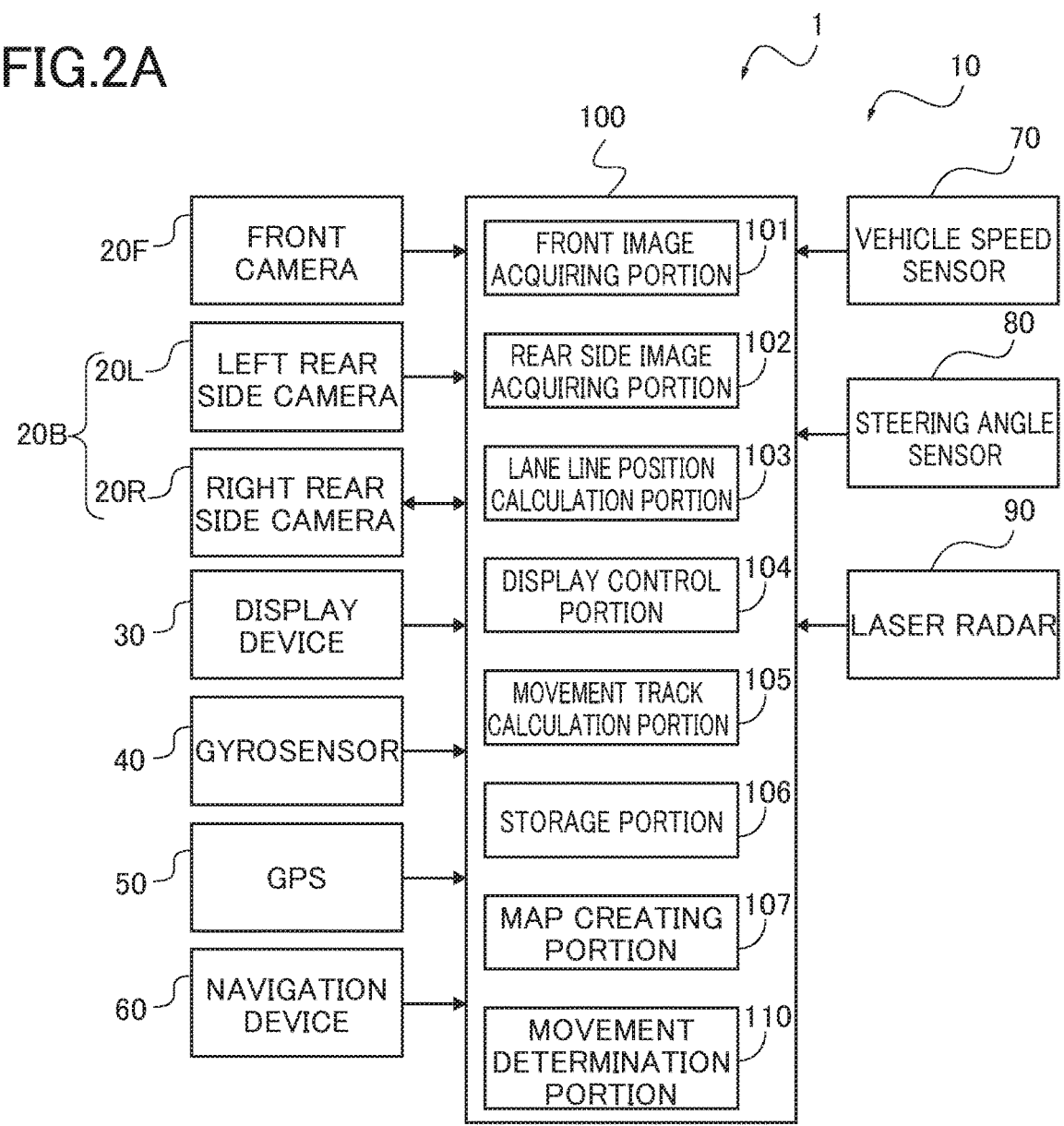
FIG. 2A is a hardware block diagram illustrating a specific configuration of a display system to which the display control device according to the first embodiment is applied.
Figure 2B:
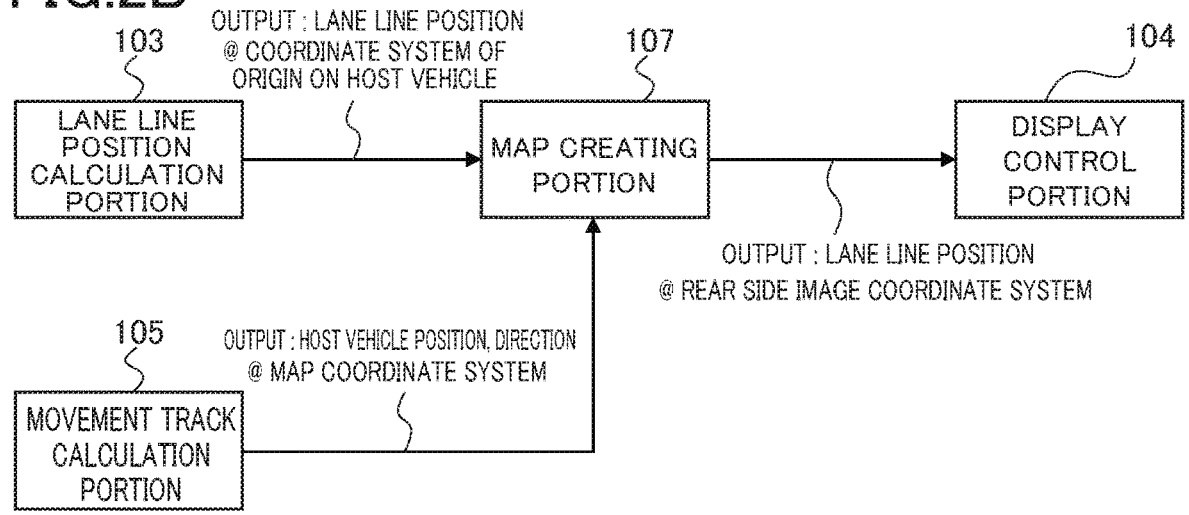
FIG. 2B is a diagram describing function blocks and a data flow.

(Description of System Configuration to which Display Control Device is applied) FIG. 2A is a hardware block diagram illustrating hardware components that constitute a display system 1 to which the display control device 100 is applied. FIG. 2B is a diagram describing function blocks and a data flow.

The display system 1 is installed in the host vehicle 10. The display system 1 includes a front camera 20F, a left rear side camera 20L, a right rear side camera 20R, a display device 30 (display portion), a gyrosensor 40, a Global Positioning System (GPS) 50, a navigation device 60, a vehicle speed sensor 70, a steering angle sensor 80, a laser radar 90, and the display control device 100.

The front camera 20F is attached in a vehicle interior of the host vehicle 10, for example, to direct forward. As a result, the front camera 20F images the front of the host vehicle 10 traveling on the passing lane 20.

The left rear side camera 20L for a digital mirror is attached to a left side of a front portion of the host vehicle 10 to direct backward. As a result, the left rear side camera 20L acquires a left rear side image including apart of aside of the host vehicle 10. The right rear side camera 20R for a digital mirror is attached to a right side of the front portion of the host vehicle 10 to direct backward. As a result, the right rear side camera 20R acquires a right rear side image including a part of a right side of the host vehicle 10. Hereinafter, the left rear side camera 20L and the right rear side camera 20R are simply referred to as a rear side camera 20B when it is not necessary to distinguish these cameras.

The display device 30 is, for example, a rectangular flat panel display (such as liquid crystal, organic EL, or plasma display), and is located to be visually recognized by a driver of the host vehicle 10. For example, a transparent touch panel capable of being pressed by a finger of the driver is attached to the display device 30. As a result, when the finger of the driver touches the display device 30, the touch is detected by the touch panel, and the position coordinate of the finger can be input.

The gyrosensor 40 detects a posture (inclination) of the host vehicle 10 relative to the horizon. The information detected by the gyrosensor 40 is output to the display control device 100, and is used for a calculation process in the display control device 100.

The GPS 50 receives a plurality of radio waves sent from an artificial satellite to detect positional information (latitude and longitude) of the host vehicle 10 in the received position of the radio waves. The information detected by the GPS 50 is output to the display control device 100, and is used for the calculation process in the display control device 100.

The navigation device 60 stores map information required for displaying a map on the display device 30, position search information for searching a desired destination by the driver, and information for guiding a route by sound. The map data includes height (above sea level) information at each point. The information stored in the navigation device 60 is output to the display control device 100, and is used for the calculation process in the display control device 100.

The vehicle speed sensor 70 detects a vehicle speed of the host vehicle 10. The steering angle sensor 80 detects a steering angle of the host vehicle 10.

The laser radar 90 is attached to a rear bumper of the host vehicle 10. The laser radar 90 emits oscillated pulse laser light to a rear region of the host vehicle 10. The laser radar 90 receives the laser light reflected by a following vehicle 16 (FIG. 4) in a rear predetermined region of the host vehicle 10 to measure a distance and a direction from the host vehicle 10 to the following vehicle 16.

(Description of Configuration of Display Control Device) The display control device 100 includes a front image acquiring portion 101, a rear side image acquiring portion 102, a lane line position calculation portion 103, a display control portion 104, a movement track calculation portion 105, a storage portion 106, and a map creating portion 107.

The display control device 100 includes inside thereof modules such as a microprocessor and a program having peripheral devices, a Central Processing Unit (CPU) which executes a required process, a Random Access Memory (RAM), a Read Only Memory (ROM), and an Application Specific Integrated Circuit (ASIC) dedicated for executing an image process and a signal process.

The front image acquiring portion 101 is configured to acquire the front images obtained in a chronological order by the front camera 20F, and store the acquired front images in the storage portion 106 in accordance with the acquired times.

The rear side image acquiring portion 102 is configured to acquire the rear side images acquired by the rear side camera 20B, and store the acquired rear images in the storage portion 106 in accordance with the acquired times.

The lane line position calculation portion 103 is configured to calculate the position of the lane marker LM2 (FIG. 1) separating the passing lane 20 and the traveling lane 22, based on the movement of the host vehicle 10 in a period from a point at which the front image is acquired by the front camera 20F.

The display control portion 104 displays, on the display device 30, a synthesized image in which pseudo lane line images I2, I3, I4 (FIG. 8) corresponding to the lane markers LM2, LM3, LM4 (FIG. 1) are superimposed onto the rear side image acquired after the movement of the host vehicle 10 by the rear side camera 20B that acquires the rear of the host vehicle 10 based on the positions of the lane markers LM2. LM3, LM4 (FIG. 1) calculated by the lane line position calculation portion 103 before the movement of the host vehicle 10.

The movement track calculation portion 105 is configured to calculate the movement track of the host vehicle 10 based on the speed vector of the host vehicle 10.

The details of the display control portion 104, the movement track calculation portion 105, and the map creating portion 107 will be described later.

(Flow of Process to be performed by Display Control Device 100) The flow of the process to be performed by the display control device 100 will be described with reference to the flowchart in FIG. 3 and the views of FIGS. 5, 6, 7A, 7B, 7C. 7D, and 8.

Figure 4:
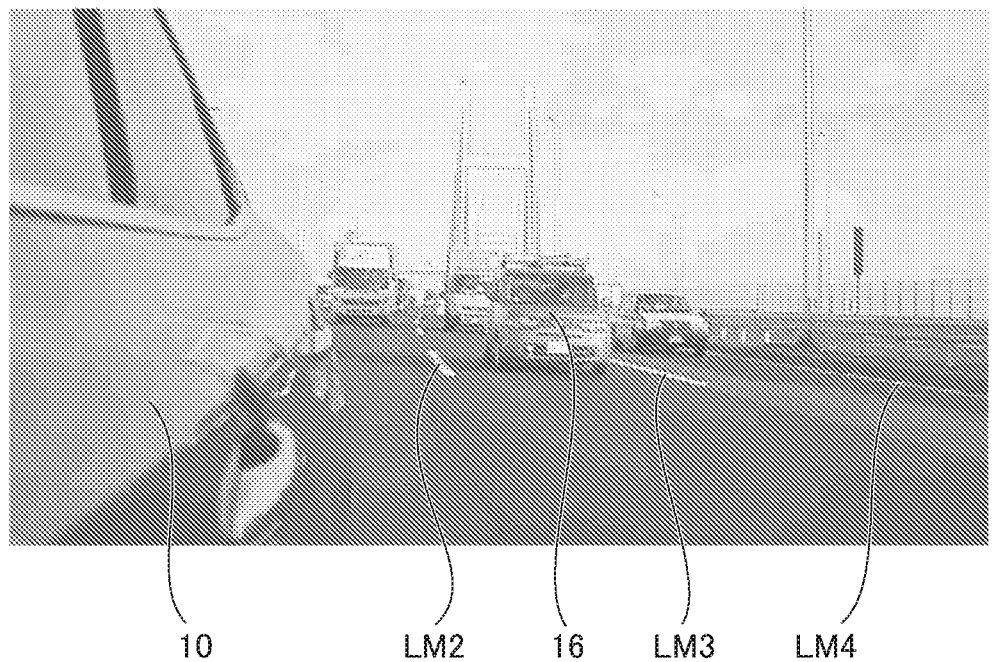
FIG. 4 is a view illustrating a road condition in which a following vehicle follows a host vehicle.
Figure 5:
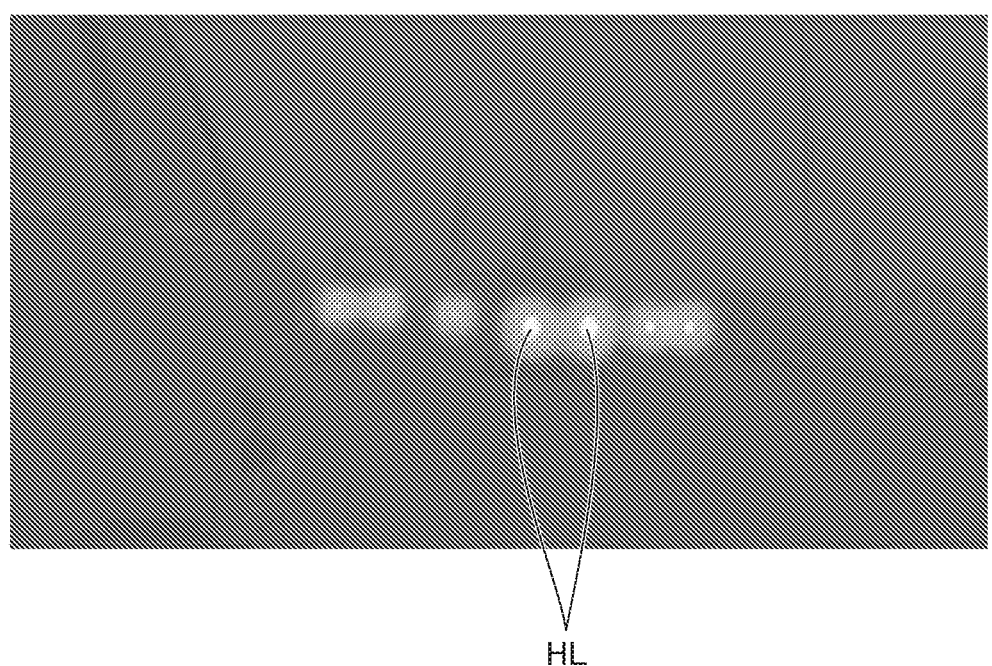
FIG. 5 is a view illustrating a road condition of the host vehicle and the following vehicle during nighttime traveling as an adoption scene of the display control device.
Figure 6:
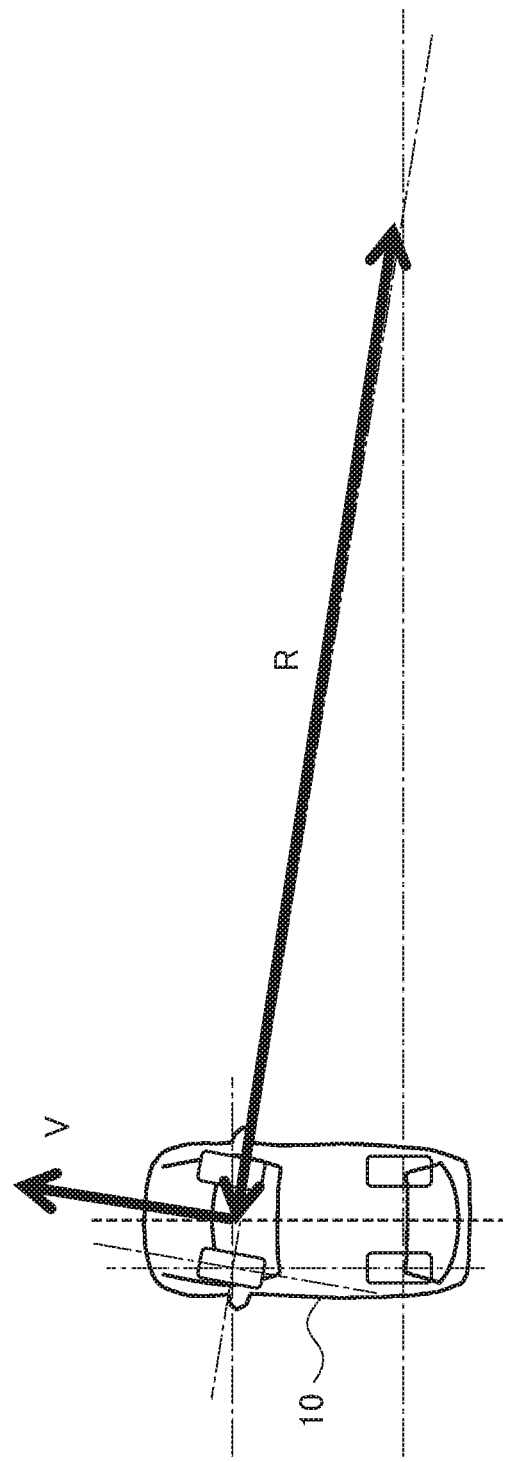
FIG. 6 is a view describing a calculation procedure of a movement track of the host vehicle.

FIG. 4 shows one example of the rear side image and the road condition in which the following vehicle 16 follows the host vehicle 10. FIG. 5 shows one example of the rear side image and the road condition for the host vehicle 10 and the following vehicle 16 during nighttime traveling as the adoption scene of the display control device 100.

Under this road condition, when a distance between the host vehicle 10 and the following vehicle 16 is short, the exposure is corrected by the brightness of a head light HL (FIG. 5) of the following vehicle 16, and the relatively dark lane markers LM2, LM3, LM4 in the rear side image are blacked, so that the blacked lane markers are not displayed on the display device 30. As a result, the driver of the host vehicle 10 cannot visually recognize the lane markers LM2, LM3, LM4 through the display device 30.

Figure 3:
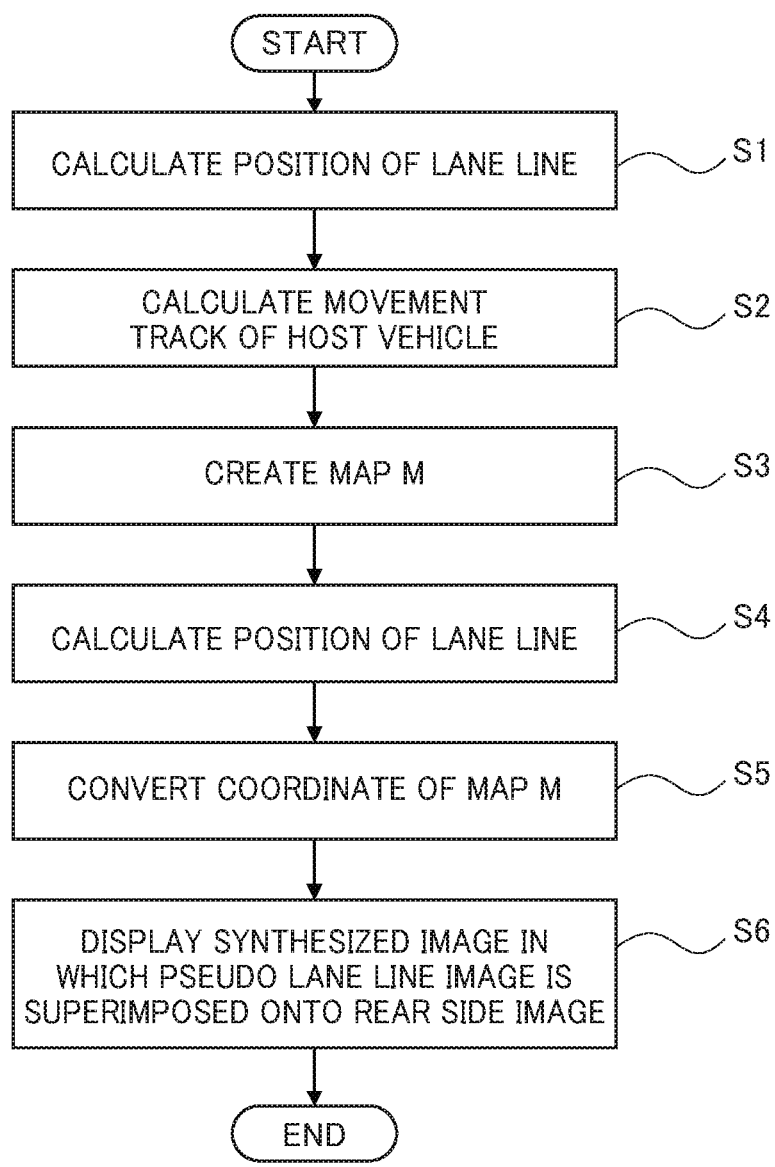
FIG. 3 is a flowchart illustrating a flow of a process to be performed by the display control device according to the first embodiment.

The process in FIG. 3 is started at the detection of the following vehicle 16 (FIG. 4) that travels on the traveling lane 22 to follow the host vehicle 10.

(Step S1) At first, the lane line position calculation portion 103 calculates the position of the lane marker LM2 (FIG. 4), for example, as the lane line based on the front image stored in the storage portion 106. The technique of calculating the position of the lane line is known as proposed in JP2014-13455A, for example. The detailed description thereof will be thus omitted. In the first embodiment, the position of the lane line is calculated by calculating an intensity of an edge (point where brightness value drastically changes).

(Step S2) Next, the movement track calculation portion 105 calculates the movement track P(t) of the host vehicle 10 by integrating the speed vector V(t) with time, as shown in the following formula (1). The information output from the vehicle speed sensor 70 and the steering angle sensor 80 is used as needed for the information required for calculating the speed vector V(t). To be more specific, the speed vector V(t) is calculated based on a rotation radius R (FIG. 6) based on the steering angle output from the steering angle sensor 80 and a vehicle speed output from the vehicle speed sensor 70.

$$p(t)=\int_0^t V(t)dt \tag{1}$$

(Step S3) Next, the map creating portion 107 creates a map based on the calculation result of the lane line position calculation portion 103 and the calculation result of the movement track calculation portion 105. FIGS. 7A, 7B, 7C, 7D are examples of the maps each having the host vehicle 10 in the center. In each map M, a region illustrated by a rectangular T1 is a range capable of being imaged by the front camera 20F. In each map M, a region illustrated by a rectangular T2 is a range capable of being imaged by the left rear side camera 20L. In each map M, a region illustrated by a rectangular T3 is a range capable of being imaged by the right rear side camera 20R. The coordinate system of the map has, for example, a reference position at the startup (engine ON) of the host vehicle 10 as the origin. One example of the reference position includes a center of a rear wheel axle, for example. The position of the origin is unchanged even though the host vehicle 10 moves (fixed to world coordinate). The coordinate axis is adjusted in accordance with the direction of the host vehicle 10 at the startup as an X axis of a left and right direction and a Y axis of a front and back direction. The calculation result of the movement track calculation portion 105 of the present embodiment uses the values in the coordinate system. The range of the map conceptionally has a limitless range. However, as the limitless range cannot be actually used, the target recording range is limited (for example, 30 min length and 30 min wide). In this case, the range of the map is switched in accordance with the movement of the host vehicle 10 such that the host vehicle 10 is located in the center of the map. However, the range of the map is switched only by the parallel movement, for example, and the rotation in accordance with the host vehicle 10 is unnecessary. This is because the rotation of the map image may deteriorate the information. The map information is kept similar to the image information. For example, when the size of one pixel is defined to 1 cm in length and 1 cm in wide, the map of 30 m in length×30 m in wide becomes 3000 pixels in length× 3000 pixels in wide. As the information kept in the map, the calculation result of the lane line position calculation portion 103 is reflected in the map. As the map is an image, when the initial value is defined as black and the lane line is defined as white, for example, the image having a white region for the lane line is acquired. In this case, the map does not keep the other information. Namely, the information kept in the map is only the lane line position.

The map creating portion 107 creates the map M (FIG. 7E) by mapping the image acquired by the front camera 20F at a preceding time T. When the host vehicle 10 moves forward by a following time T+1, the map creating portion 107 updates the map M along the forward movement (FIG. 7F). A dotted line frame in FIG. 7F illustrates the map range at the time T1+1. In this case, the map creating portion 107 cancels a portion outside the range in the new map M. The map creating portion 107 moves the map M in parallel by the movement of the host vehicle 10 (FIG. 7G). FIG. 7G illustrates the map information at the time T+1 before the position of the lane line is reflected. The map creating portion 107 executes a mapping conversion process to the map M to correct a distance and a direction that the host vehicle 10 moves forward by the following time T+1 and a change in a posture of the host vehicle 10 (FIG. 7G). The map creating portion 107 blacks a portion extended by the new map as an initial value (FIG. 7G). The map creating portion 107 performs alignment according to the movement of the host vehicle 10, and updates the map M while absorbing the distance and the direction that the host vehicle 10 moves forward and the change in the posture of the host vehicle 10 (FIG. 7H). FIG. 7H illustrates the map information at the time T+1 after the position of the lane line is reflected. The map M for each time corresponds to moment value information of the calculation result of the lane line position calculation portion 103. It is therefore unnecessary for the map creating portion 107 to accumulate the map M at each time.

(Step S4) Next, the lane line position calculation portion 103 calculates each position of the lane markers LM1 to LM4, for example, by executing a process similar to Step S1 based on the map M stored in the storage portion 106.

(Step S5) Next, the display control portion 104 converts a two dimensional coordinate system of the map M into a three dimensional coordinate system of the camera coordinate system. This conversion method is known by affine transformation which enlarges, reduces, or rotates an image, for example. The detailed description for the method will be thus omitted.

(Step S6) Next, the display control portion 104 displays, on the display device 30, a synthesized image SI (FIG. 8) in which the pseudo lane line images I2, I3, I4 corresponding to the lane markers LM2, LM3, LM4, respectively, are superimposed on the rear side image BI based on the map (each position of lane markers LM2, LM3, LM4) created by the map creating portion 107. The pseudo lane line images I2, I3, I4 are images in which the lane markers LM2, LM3, LM4 are illustrated, respectively.

More specifically, in the above embodiment, the display control portion 104 can display the lane marker LM2 on the display device 30 to be clearly recognized by the driver even under a condition in which it is difficult for the lane marker LM2 (FIG. 1) separating the passing lane 20 and the traveling lane 22 to be reflected in the rear side image. The lane marker LM3 (FIG. 1) separating the traveling lane 22 and the traveling lane 24 and the lane marker LM1 (FIG. 1) separating the right zone RZ and the left zone LZ are similarly displayed on the display device 30. The condition in which it is difficult for the lane marker LM2 to be reflected in the rear side image includes, for example, a condition in which the light of the head light of the following vehicle 16 is incident on the rear side camera 20B of the host vehicle 10 during the nighttime traveling of the host vehicle 10, and a condition in which excessively strong sunlight is incident on the rear side camera 20B of the host vehicle 10 during daytime traveling of the host vehicle 10.

Second Embodiment

Another specific embodiment of a display system to which the display control device according to the present disclosure is applied will be described with reference to the drawings.

Figure 9A:
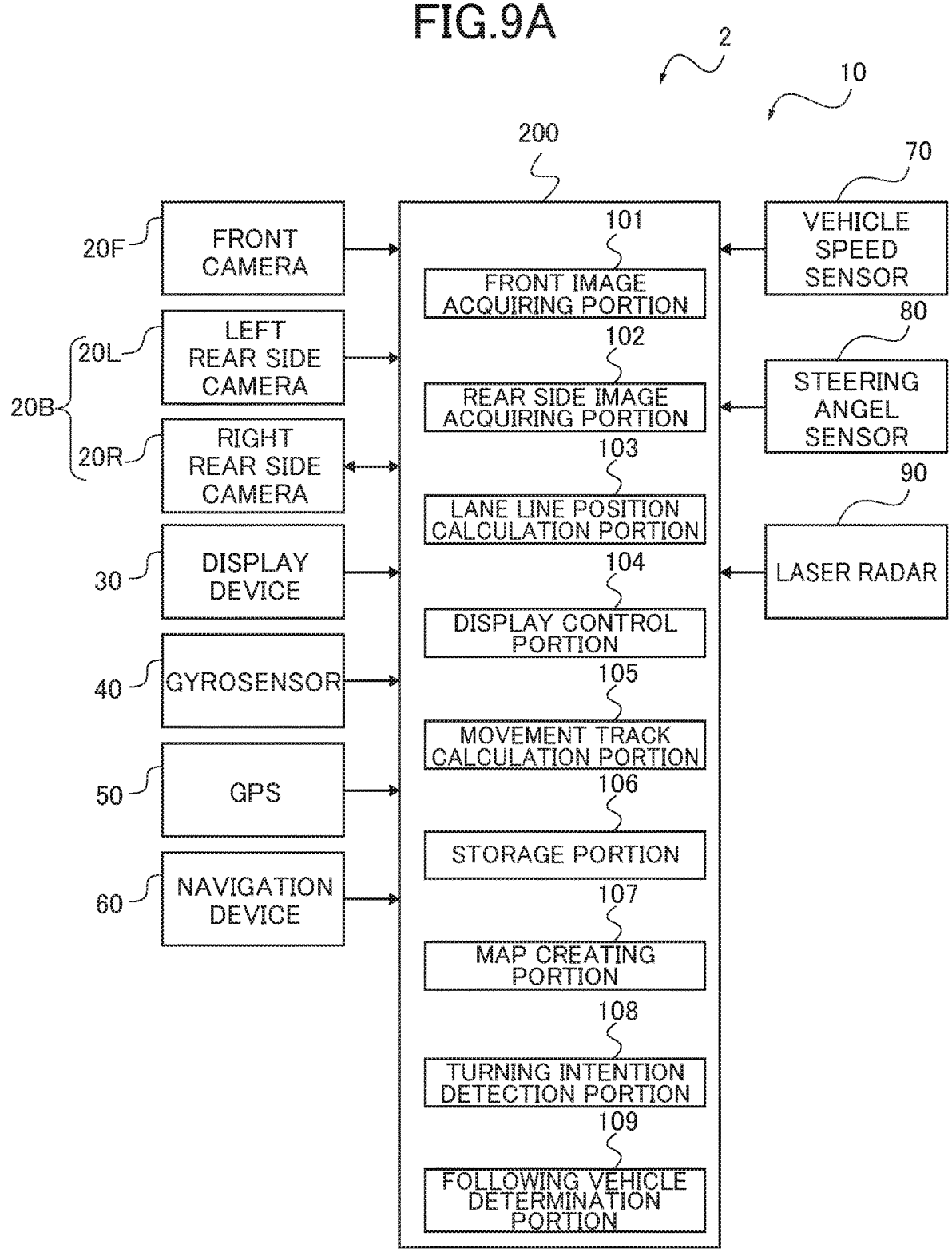
FIG. 9A is a hardware block diagram illustrating a specific configuration of a display system to which a display control device according to a second embodiment is applied.
Figure 9B:
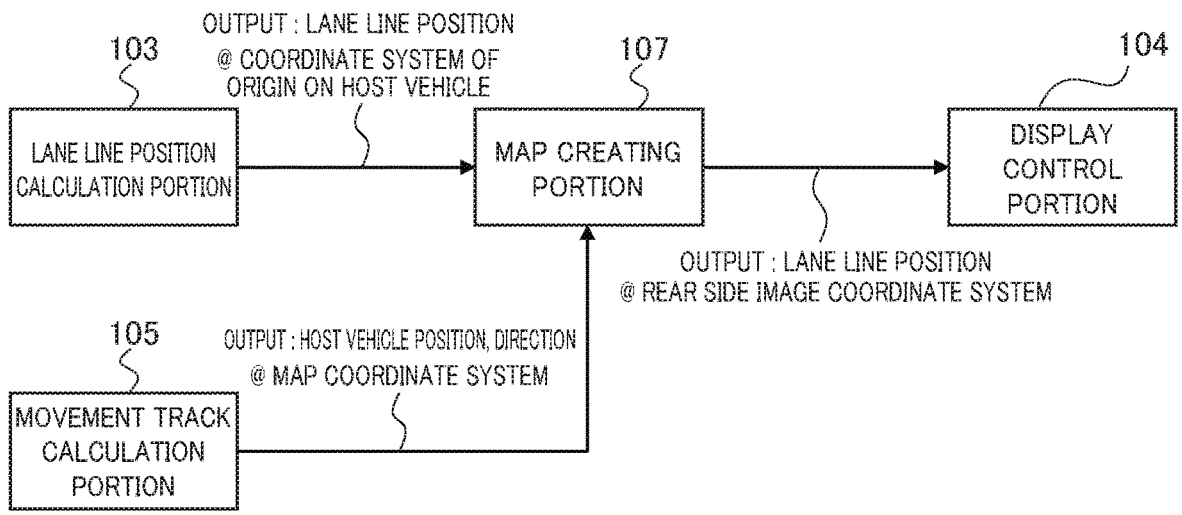
FIG. 9B is a diagram describing function blocks and a data flow.

(Description of System Configuration to which Display Control Device is applied) FIG. 9A is a hardware block diagram illustrating hardware components that constitute a display system 2 to which a display control device 200 according to the second embodiment is applied. FIG. 9B is a diagram illustrating function blocks and a data flow.

As the same reference numbers are applied to the same components as the components described in the first embodiment, the detailed description thereof will be omitted. The display control device 200 is the same as the display control device 100 (FIGS. 2A, 2B) of the first embodiment except that the display control device 200 newly includes a turning intention detection portion 108 and a following vehicle determination portion 109.

The turning intention detection portion 108 is configured to detect a turning intention of the driver of the host vehicle 10. The turning intention detection portion 108 is configured to detect the direction of the steering and the angle at which the direction changes, and to detect the turning intention based on the detection results. Here. "turning" means the entire operation of the steering, and is a situation in which the host vehicle 10 curves.

The following vehicle determination portion 109 is configured to determine whether or not the following vehicle 16 (FIG. 4) that travels on the traveling lane 22 to follow the host vehicle 10 exists. In addition, the information output from the laser radar 90 is used as needed for the information required for determining the existence of the following vehicle 16.

(Flow of Process to be performed by Display Control Device 200) Next, the flow of the process to be performed by the display control device 200 will be described with reference to the flowchart in FIG. 10 and the views of FIGS. 7C, 8.

Figure 7A:
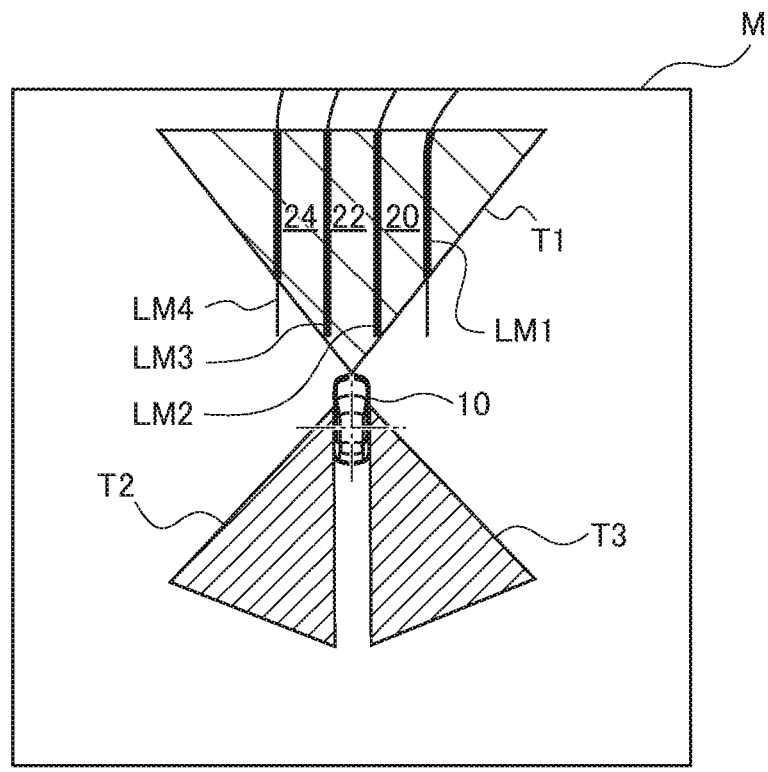
FIG. 7A is a view describing one example of a map that is created to have the host vehicle in a center.
Figure 7B:
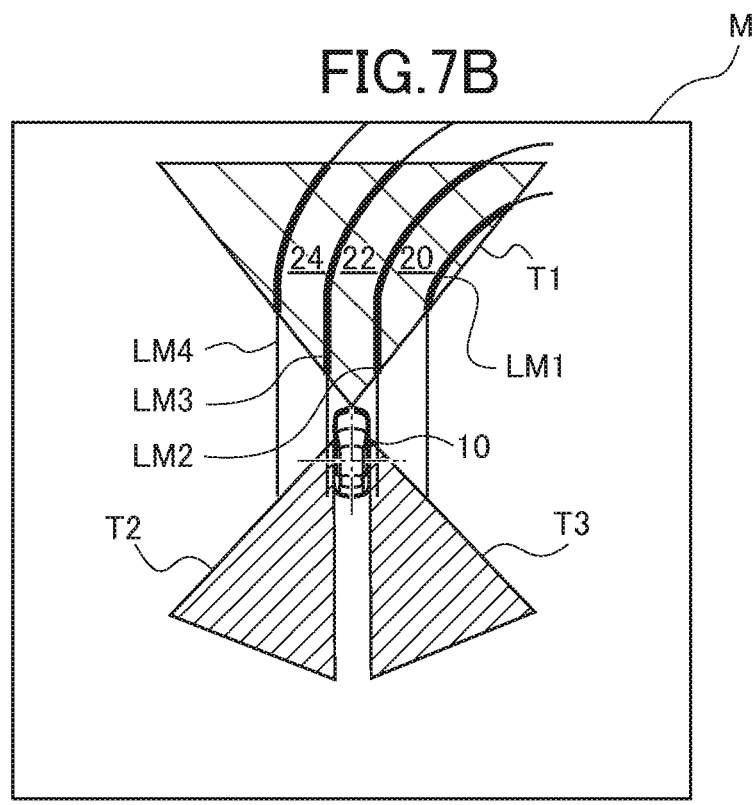
FIG. 7B is a view describing one example of the map that is created to have the host vehicle in the center.
Figure 7C:
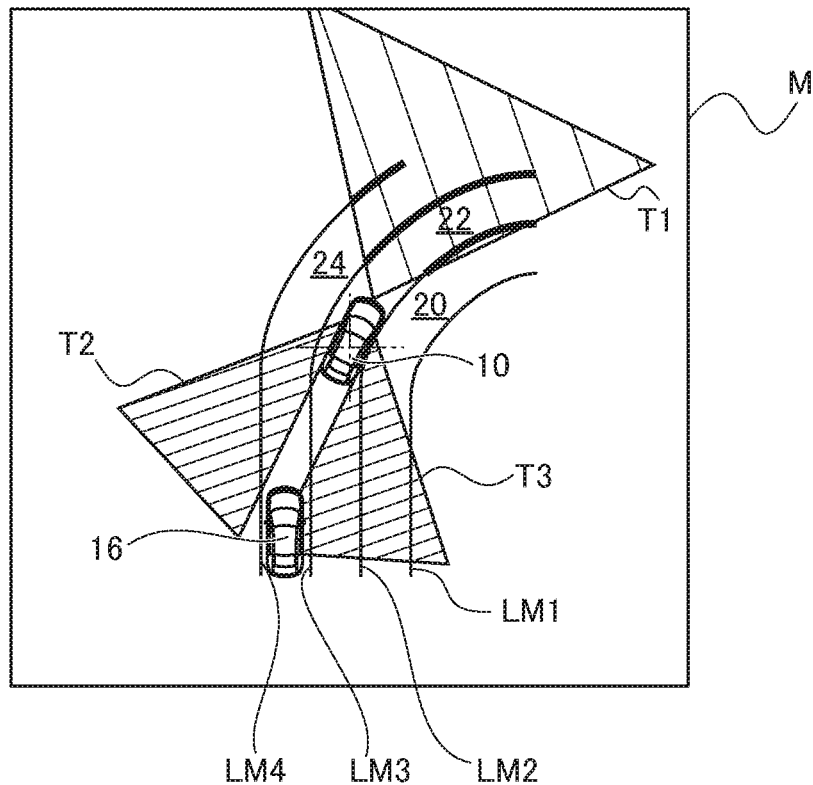
FIG. 7C is a view describing one example of the map that is created to have the host vehicle in the center.
Figure 7D:
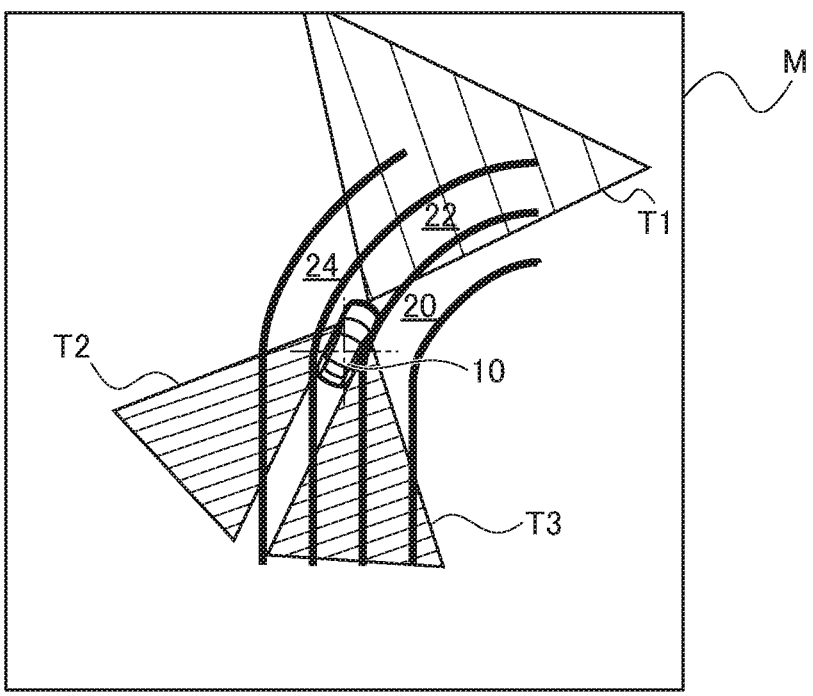
FIG. 7D is a view describing one example of the map that is created to have the host vehicle in the center.
Figure 7E:
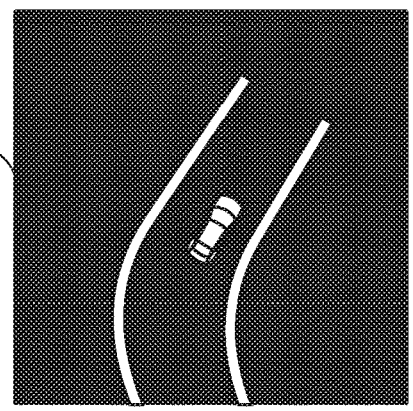
FIG. 7E is a view describing one example of a map updating process (Part 1).
Figure 7F:
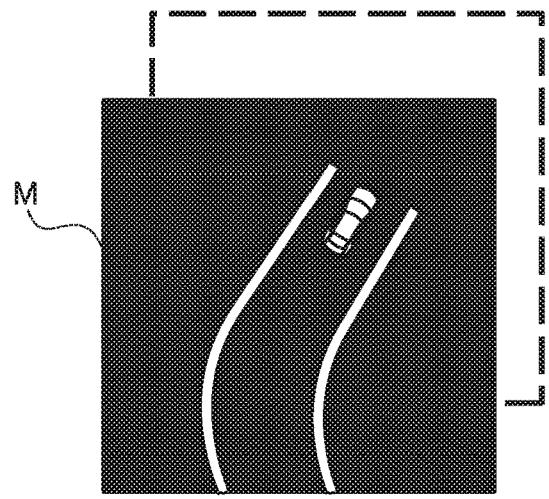
FIG. 7F is a view describing one example of the map updating process (Part 2).
Figure 7G:
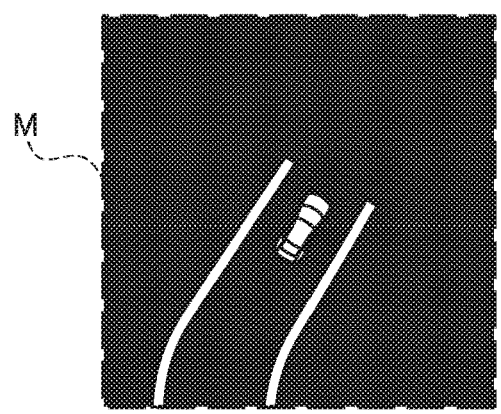
FIG. 7G is a view describing one example of the map updating process (Part 3).
Figure 7H:
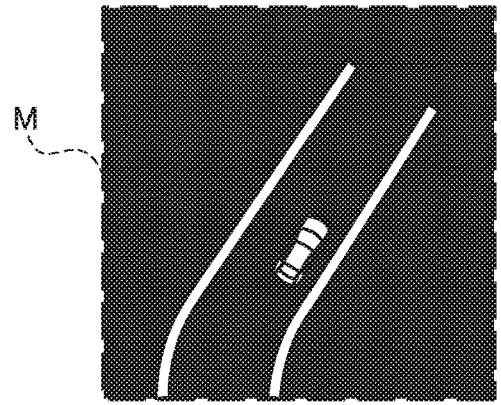
FIG. 7H is a view describing one example of the map updating process (Part 4).
Figure 8:
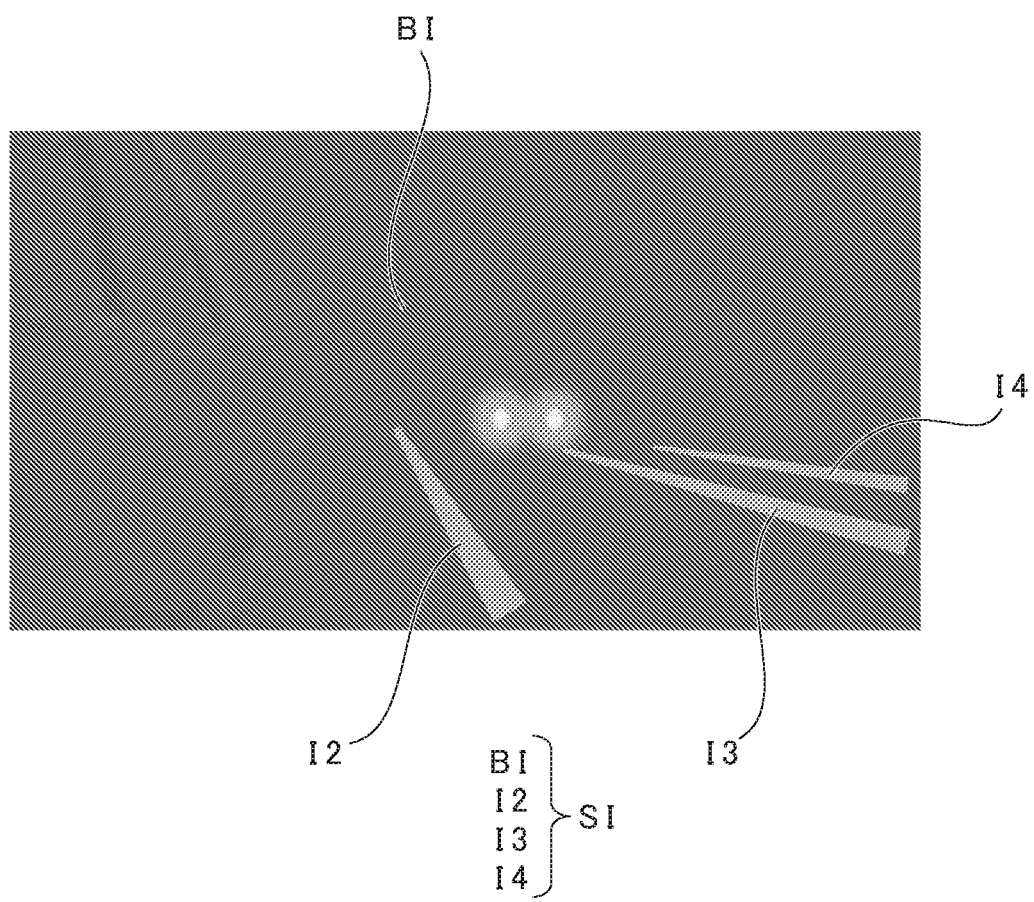
FIG. 8 is a view describing one example of a synthesized image in which pseudo lane line images are superimposed onto a rear side image.

FIG. 7C illustrates one example of the adoption scene of the display control device 200, and the road condition in which the following vehicle 16 following the host vehicle 10 exists. Under this road condition, the host vehicle 10 curves the traveling lane 22, and the following vehicle 16 is located substantially just behind the host vehicle 10 on the traveling lane 24.

Under such a road condition, it is difficult for the driver of the host vehicle 10 to visually recognize whether the following vehicle 16 travels on the traveling lane 22 or the traveling lane 24 through the display device 30. It is therefore preferable for the pseudo lane line images I2, I3, I4 (FIG. 8) to be displayed on the display device 30 with striking colors, and to clarify that the following vehicle 16 travels on the traveling lane 22. The striking colors include warm colors which glow in darkness, namely, red, pink, and fluorescent colors. More specifically, the striking color is a color which is more conspicuous than a white line or a yellow line used in the lane line of the general traffic lane, and is a color which makes the lane marker to be clearly visually recognized by the driver of the host vehicle 10.

Figure 10:
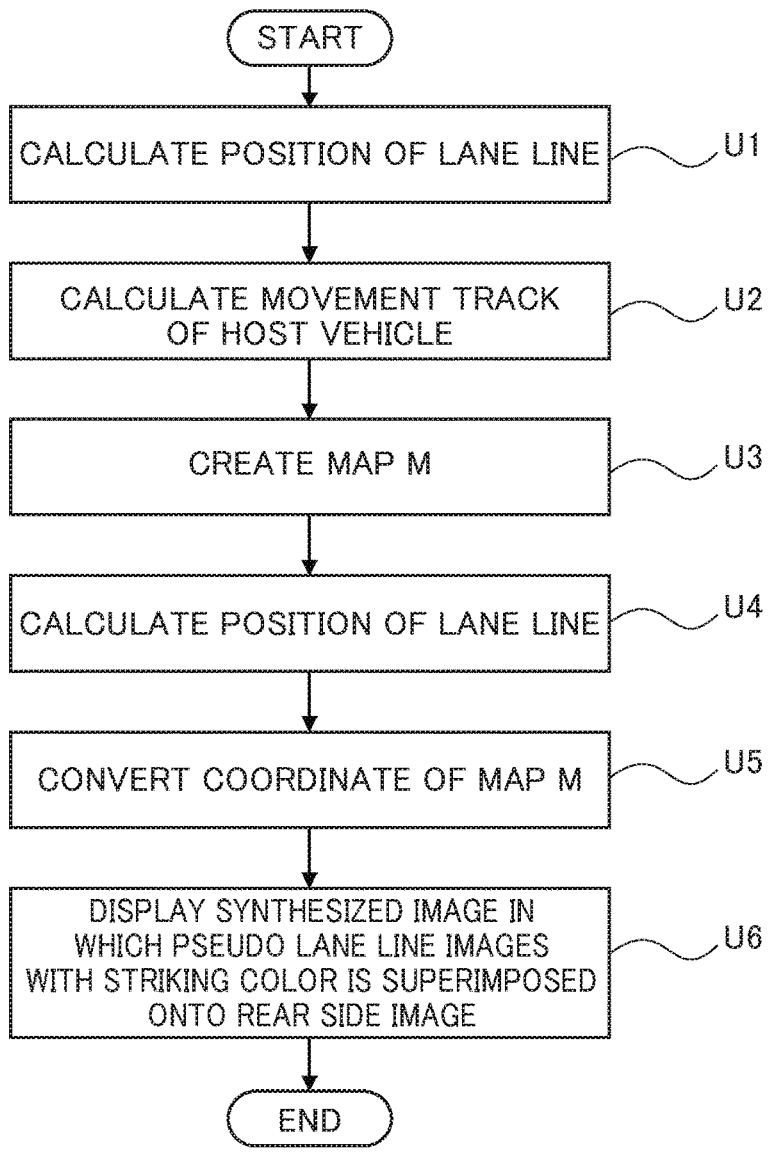
FIG. 10 is a flowchart illustrating a flow of a process to be performed by the display control device according to the second embodiment.

The process shown in FIG. 10 is started when the turning intention detection portion 108 confirms the turning intention and the following vehicle determination portion 109 detects that the following vehicle 16 (FIG. 4) is located substantially just behind the host vehicle 10.

As steps U1, U2, U3, U4, U5, U6 illustrated in FIG. 10 are steps similar to the steps S1, S2, S3, S4, S5, S6 in FIG. 4, the detailed description thereof will be omitted. That is, after the steps U1 to U5 illustrated in FIG. 10 are performed, the process proceeds to the step U6. In Step U6, the display control portion 104 displays, on the display device 30, the synthesized image SI (FIG. 8) in which the pseudo lane line images I2, I3, I4 with the striking colors are superimposed onto the rear side image BI.

According to the display control device 200 and the display system 2 of the second embodiment, in addition to the effects in the first embodiment, the display control portion 104 displays, on the display device 30, the synthesized image SI in which the pseudo lane line images I2, I3, I4 with striking colors are superimposed onto the rear side image BI under the road condition which makes difficult for the driver of the host vehicle 10 to know whether the following vehicle 16 travels on the traveling lane 22 or the traveling lane 24. Hereby, the driver of the host vehicle 10 may not misjudge that the following vehicle 16 travels on the traveling lane 24, and the display system 2 can safely support the driving operation of the driver.

As described above, the embodiments of the present disclosure are described in details with reference to the drawings. However, the embodiments are merely the examples of the present disclosure. The present disclosure is not limited to the configurations of the embodiments, and changes in a design are included in the present disclosure within the range which does not depart from the gist of the present disclosure.

In the first embodiment, the nighttime traveling scene of the host vehicle 10 is described as the adoption scene of the display control device 100. However, it is not limited thereto. For example, the display control device 100 may be adopted for the daytime traveling of the host vehicle 10. That is, when the sunlight is incident on the rear side camera 20B due to the backlight, the lane markers LM1 to LM4 in the rear side image BI are not displayed on the display device 30 due to the halation caused by the brightness of the sunlight.

As a result, the driver cannot visually recognize the lane markers LM1 to LM4. On the other hand, in the first embodiment, the display control portion 104 can display, on the display device 30, the lane marker LM2 separating the passing lane 20 and the traveling lane 22 with high accuracy regardless of the condition of the lane marker LM2. The lane markers LM1, LM3 can be similarly displayed.

The first embodiment describes the example in which the front camera 20F is attached in the vehicle interior to image the front of the host vehicle 10. However, it is not limited thereto. For example, the front camera 20F may be attached outside the vehicle interior to be used for creating an overhead image as long as the depth of filed and the angle of field are applicable for creating the overhead image.

The first embodiment describes the example in which the front camera 20F images the front of the host vehicle 10 in a chronological order at equal intervals. However, it is not limited thereto. For example, the front camera 20F may image the front of the host vehicle 10 in a chronological order at unequal intervals.

The first embodiment describes the example in which the display control portion 104 anticipates a traveling history of the host vehicle 10 with the liner interpolation of the frames when the number of front images (frames) is a few. However, it is not limited thereto. The display control portion 104 may anticipate the traveling history of the host vehicle 10 with any one of generally used methods.

The first embodiment describes the example in which the pseudo lane line images I2, I3, I4 are acquired by illustrating the lane markers. However, it is not limited thereto. The pseudo lane line images I2, I3, I4 may be acquired by an image process based on the live lane markers LM2, LM3, LM4. This image process includes a process of changing the lane markers LM2, LM3, LM4 in the front image acquired by the front camera 20F into the same image as the rear side image acquired by the rear side camera 20B, and a process of changing the brightness of the front image acquired by the front camera 20F into improved brightness. For example, the pseudo lane line image may be an image in which the traveling lane sandwiched by the lane markers is illustrated.

The first embodiment describes the example in which the display control portion 104 displays, on the display device 30, the synthesized image in which the pseudo lane line images I2, I3, I4 are superimposed onto the rear side image BI. However, it is not limited thereto. For example, the display control device 100 may include a movement determination portion configured to determine whether or not the host vehicle 10 moves to the traveling lane 22.

The display control portion 104 may display, on the display device 30, the synthesized image SI in which the pseudo lane line images I2, I3, I4 are superimposed onto the rear side image BI according to the information output from the movement determination portion. More specifically, the display control portion 104 may display, on the display device 30, the synthesized image SI in which the pseudo lane line images I2, I3, I4 with striking colors such as pink, yellow, and red are superimposed onto the rear side image BI when the driver turns on a blinker as an intention of changing the traffic lane from the passing lane 20 to the traveling lane 22.

The first embodiment describes the example in which the display control portion 104 displays, on the display device 30, the synthesized image SI in which the pseudo lane line images I2, I3, I4 are superimposed onto the rear side image BI based on each position of the lane markers LM1 to LM4 calculated by the lane line position calculation portion 103. However, it is not limited thereto. For example, the display control portion 104 may display, on the display device 30, the pseudo lane line image I3 corresponding to the lane marker LM3 with a color different from that of the pseudo lane line image I2 corresponding to the lane marker LM2 based on each position of the lane markers LM1 to LM4 calculated by the lane line position calculation portion 103. More specifically, it is only necessary that the color of the pseudo lane line image I2 differs from the color of the pseudo lane line image I3.

The second embodiment describes the example in which the display control portion 104 displays, on the display device 30, the synthesized image SI in which the pseudo lane line images I2, I3, I4 with warm colors such as red, pink, and yellow are superimposed onto the rear side image BI. However, it is not limited thereto. For example, the display control portion 104 may display, on the display device 30, the synthesized image SI in which the pseudo lane line images I2, I3, I4 with cool colors such as blue green, blue, and blue purple or neutral colors such as yellow green, green, purple, and achromatic colors are superimposed onto the rear side image BI. More specifically, the colors of the pseudo lane line images I2, I3, I4 are not limited as long as they are striking colors.

The second embodiment describes the example in which the display control device 200 is adopted to the road condition in which the host vehicle 10 curves the traveling lane 22 and the following vehicle 16 during traveling on the traveling lane 24 is located substantially just behind the host vehicle 10. However, it is not limited thereto. For example, the display control device 200 may be adopted to the road condition in which the host vehicle 10 curves the passing lane 20, and the following vehicle 16 during traveling on the traveling lane 22 is located substantially just behind the host vehicle 10.

The first and second embodiments describe the example having the three lanes in the left zone LZ. However, it is not limited thereto. The left zone LZ may include two lanes, four lanes, or more. The right zone RZ may include the same number of lanes as the left zone LZ.

The invention claimed is:

1. A display control device comprising:
   a front image acquiring portion configured to acquire front images acquired in a chronological order by a front camera that images a front of a vehicle traveling on a traveling lane;
   a lane line position calculation portion configured to calculate a position of a lane line separating the traveling lane and an adjacent lane adjacent to the traveling lane based on movement of the vehicle in a period from a point at which the front image is acquired by the front camera;

a movement track calculation portion configured to calculate a movement track of the vehicle based on a speed vector of the vehicle;

a map creating portion configured to create a map regarding the position of the lane line in a range capable of being imaged by the front camera and a range capable of being imaged by a rear camera that images a rear of the vehicle based on the position of the lane line calculated based on the front image, which is a calculation result of the lane line position calculation portion, and a direction and a distance of the vehicle and a change in a posture in the period from the point at which the front image is acquired, which is a calculation result of the movement track calculation portion; and a display control portion configured to display, on a display portion, a synthesized image in which a pseudo lane line image corresponding to the lane line in the map regarding the position of the lane line is superimposed onto a rear side image acquired after the movement of the vehicle by the rear camera based on the map created by the map creating portion.

2. The display control device according to claim 1, comprising:

a movement determination portion configured to determine whether or not the vehicle moves to the adjacent lane; wherein the display control portion is configured to display, on the display portion, the synthesized image in which the pseudo lane line image with a striking color is superimposed onto the rear side image when the movement determination portion determines that the vehicle moves to the adjacent lane.

3. The display control device according to claim 1, comprising:

a turning intention detection portion configured to detect a turning intention of a driver of the vehicle, wherein the display control portion displays, on the display portion, the synthesized image in which the pseudo lane line image with the striking color is superimposed onto the rear side image when the turning intention detection portion detects the turning intention.

4. The display control device according to claim 1, comprising:

a following vehicle determination portion configured to determine whether or not a following vehicle that travels on the adjacent lane to follow the vehicle exists, wherein the display control portion displays, on the display portion, the synthesized image in which the pseudo lane line image with the striking color is superimposed onto the rear side image when the following vehicle determination portion determines that the following vehicle exists.

5. The display control device according to claim 1, wherein the display control portion displays, on the display portion, a pseudo lane line image corresponding to the lane line separating the adjacent lane and a next adjacent lane adjacent to the adjacent lane on a side opposite to the traveling lane with a color different from a pseudo lane line image corresponding to the lane line separating the traveling lane and the adjacent lane adjacent to the traveling lane based on the position of the lane line calculated by the lane line position calculation portion.

6. A display system comprising:

the display control device according to claim 1, the display portion;

a vehicle speed sensor configured to detect a vehicle speed of the vehicle; and a steering angle sensor configured to detect a steering angle of the vehicle.

7. The display control device according to claim 1, wherein the speed vector is calculated based on a rotation radius based on a steering angle output from a steering angle sensor and a speed output from a vehicle speed sensor.

8. The display control device according to claim 1, wherein the display control portion is configured to display the synthesized image on the display portion in a condition in which the lane line itself is blacked out due to exposure correction of the rear camera.

* * * * *